Oct. 7, 1941.     C. SEIPPEL     2,257,982
GAS TURBOCOMPRESSOR PLANT
Filed Aug. 17, 1938
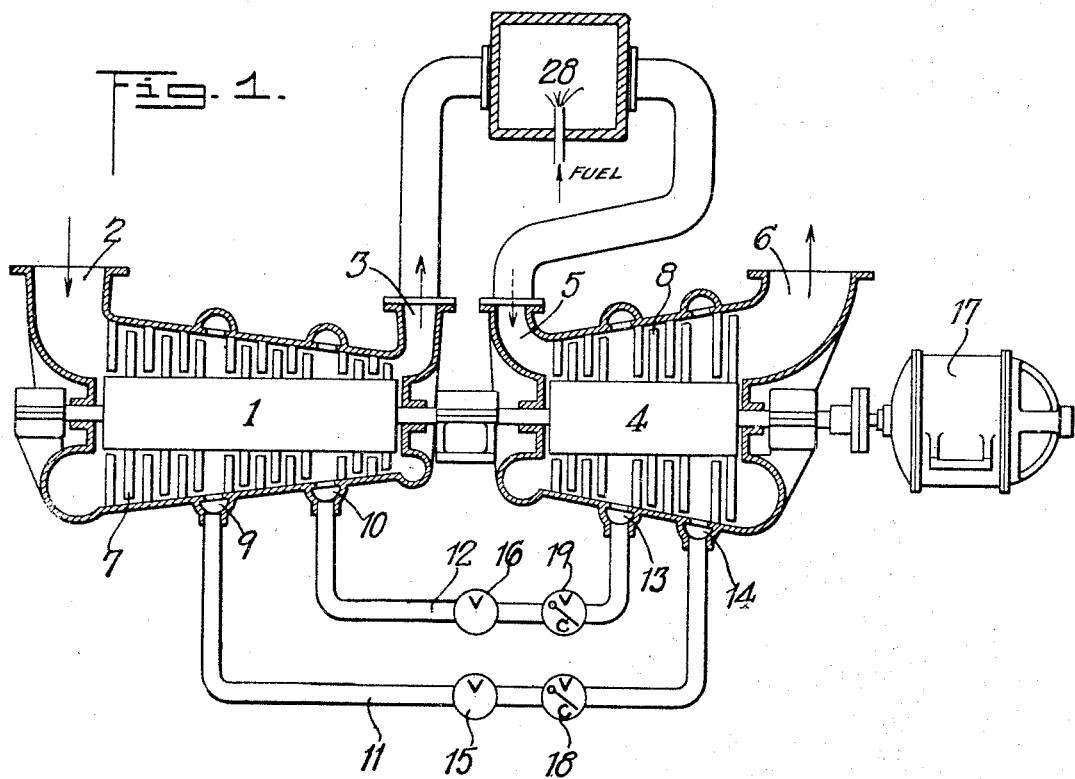
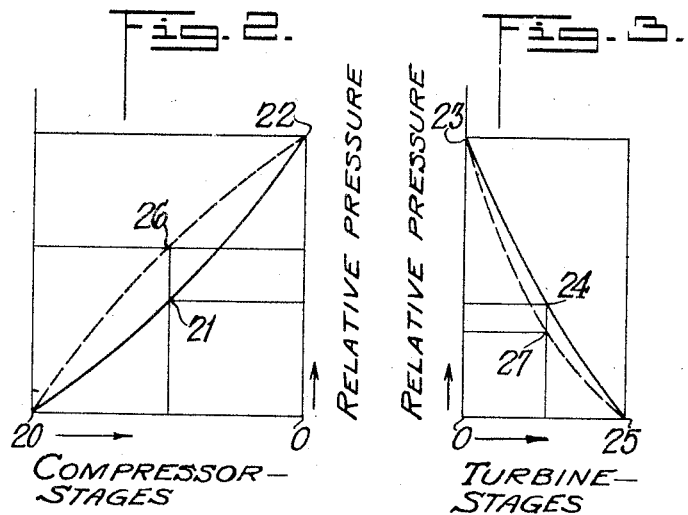
INVENTOR
CLAUDE SEIPPEL,
BY Karl A. Mayr
ATTORNEY Patented Oct. 7, 1941

2,257,982

UNITED STATES PATENT OFFICE 2,257,982

GAS TURBOCOMPRESSOR PLANT

Claude Seippel, Ennetbaden, Switzerland, assignor to Aktiengesellschaft Brown, Boveri & Cie, Baden, Switzerland Application August 17, 1938, Serial No. 225,408
In Germany August 23, 1937

4 Claims. (Cl. 60—41)

The present invention relates to gas turbocompressor plants, more particularly to plants in which the pressure of the medium compressed in a multistage compressor is at least equal to the pressure of the operating gas entering a multistage turbine and in which the pressure at individual stages of the compressor is maintained equal or in predetermined proportion to the pressure at individual stages of the gas turbine.

A plant according to the present invention may be used for producing mechanical and/or electric power or it may be used for compressing air for charging internal combustion engines or for compressing air or gases for operating high pressure combustion chambers or reaction chambers for carrying out chemical processes. Plants of this type comprise a gas turbine and a compressor connected to and operated by said turbine. The medium compressed in the compressor is used either directly for operating the gas turbine or is first used for producing power, for example, in an internal combustion engine, and/or for carrying out a heating, combustion or chemical process. Usually considerable pressures must be produced in the compressor such as 15 lbs. per sq. inch to 45 lbs. per sq. inch or even more; the gas turbine is also required to operate at considerable pressure. Since usually also large amounts of medium must be compressed, compressors of the multistage rotary type must be used.

In plants in which turbine and compressor are mechanically interconnected and also for compressed medium and gas flow, i. e. where the medium compressed in the compressor is used directly or indirectly for operating the gas turbine satisfactory cooperation of turbine and compressor is always possible at a certain output and pressure and/or temperature of the operating media and a certain speed of the turbine and compressor. Cooperation, however, is difficult and at reduced efficiency when one or more of these operating characteristics is or are changed as, for example, at partial load operation.

It is an object of the present invention to provide a gas-turbo-compressor plant of the type specified in which satisfactory cooperation at highest efficiency of turbine and compressor is assured at all operating conditions by the application of simple and inexpensive means. According to the present invention the gas turbine as well as the compressor are each provided with one or more leak offs. The leak offs of the compressor are individually connected by means of equalizing conduits with individual leak offs of the turbine where the pressure at normal operating conditions is equal or lower. This arrangement in many cases yields the desired result without additional control means. Throttling means and/or reducing valves may be provided in said equalizing conduits for further improvement.

Further and other objects of the present invention will be hereinafter set forth in the accompanying specification and shown in the drawing which, by way of illustration, shows what I now consider to be a preferred embodiment of my invention.

In the drawing:

Figure 1 is a diagrammatic part cross sectional layout of a plant according to the present invention.

Figure 2 is a diagram illustrating relative pressure conditions in the compressor.

Figure 3 is a diagram illustrating relative pressure conditions in the gas turbine.

Referring more particularly to Fig. 1 of the drawing, 1 designates the compressor having an intake 2 and a discharge side 3. 4 designates the gas turbine having a gas inlet 5 and a gas outlet 6. 7 designates the blading of the compressor and 8 that of the gas turbine. 9 and 10 are leak offs of the compressor which are individually connected with the leak offs 14 and 13 of the gas turbine respectively by means of conduits 11 and 12. The leak offs are provided at such pressure stages of the compressor and turbine that, at normal operating conditions, the pressure at both ends of the conduits 11 and 12 is the same and there is no flow of medium in said conduits.

Diagram Fig. 2 shows the relative pressure conditions in the compressor. At normal operating condition the pressure of the medium to be compressed in the compressor 1, for example air, rises as indicated by the solid line in Fig. 2 on its path from inlet 2 to outlet 3.

Diagram Fig. 3 shows the relative pressure conditions in turbine 4. At normal operating conditions the gas pressure falls on its path from inlet 5 to outlet 6 as indicated by the solid line in Fig. 3.

The solid lines in Figures 2 and 3 do not show the absolute existing pressures but indicate only the relative pressure conditions. The inclination of the lines gives a picture of the relative pressure and expansion conditions in bladings 7 and 8.

If for any reason the pressure conditions at one point of the plant are changed, for example reduced because the resistance between compressor and gas turbine is reduced or the load on the plant is reduced, the relative pressure conditions in the compressor do not follow the line 20—21—22 but the dotted line 20—26—22, i. e. the first stages of the compressor produce a relatively higher pressure and the high pressure stages produce relatively less pressure. The result is a reduction of efficiency of the compressor. In the gas turbine opposite conditions are obtained: expansion is most marked in the high pressure stages whereas the low pressure stages do little or no work. The expansion does not follow the solid line 23—24—25 but the dotted line 23—27—25 in Fig. 3. The velocity of the medium flowing through the turbine buckets is not that for which the buckets are designed.

If, according to the invention, one or more stages of the compressor are directly connected with one or more stages of the turbine the pressure is equalized and the operation takes place at better efficiency. Since the pressure in the compressor rises from point 21 to point 26 and in the turbine is reduced from point 24 to 27 compressed medium flows in a conduit connecting the compressor stage corresponding to point 21, 26 and the turbine stage corresponding to point 24, 27 from the compressor into the turbine. The volume of medium flowing through the first stages of the compressor is thereby increased and the relative pressure decreased, the compressor buckets are filled and its efficiency is increased. The medium flowing from the compressor through the equalizing conduit into the gas turbine causes an increase of pressure in the turbine and a reduction of expansion in its high pressure and increase of expansion in its low pressure stages, whereby normal and high efficiency operating conditions are restored.

In most cases the equalization takes place automatically and if the cross sectional areas of the equalizing conduit are correctly dimensioned no further regulating devices are needed. In order to be able to adapt the installation to varying conditions throttling orifices, valves 15, 16 and/or check valves 18, 19 may be provided. By suitable operation of control means 15 and/or 16 the conditions in the equalizing conduits can be adjusted to produce best equalizing conditions.

The medium discharged through outlet 3 may be used for charging the combustion chamber of an internal combustion motor, a combustion chamber such as is shown in the patent to W. G. Noack No. 1,948,539, or for serving a chemical process in a reaction chamber such as is shown in Patent No. 2,227,666, issued January 7, 1941, to W. G. Noack, and in copending application of W. G. Noack, Serial No. 209,906, filed May 25, 1938, a combustion chamber 28 being indicated in Fig. 1. The combustion gas produced in and discharged from said combustion chamber is used for operating turbine 4.

For starting up the plant, for quick acceleration or slowing up at changing operating conditions and for making up differences in the output of the turbine and load requirements of the compressor an auxiliary motor 17 may be provided. If the plant is used for the production of power, 17 may be the main electric generator. In a plant in which the medium compressed in compressor 1 is used for the operation of a high pressure combustion chamber or chemical reaction chamber 28 and in which plant the turbine 4 is operated by the high pressure exhaust gases from chamber 28, the machine 27 may operate at times as motor and at other times as generator. If 28 is an internal combustion motor which can be started and operated by itself motor 17 may be omitted.

While I believe the above described embodiments of my invention to be preferred embodiments, I wish it to be understood that I do not desire to be limited to the exact details of design and construction shown and described, for obvious modifications will occur to a person skilled in the art.

I claim:

1. A heat power plant comprising a multistage gas turbine, a multistage rotary compressor driven by said turbine, a high pressure combustion chamber comprising fuel supply means and being connected for compressed air flow with said compressor and being supplied with combustion air therefrom and being connected for combustion gas flow with and supplying combustion gas to said turbine for its operation, and a pressure equalizing conduit directly interconnecting such an intermediate stage of said compressor and such an intermediate stage of said turbine that air flows through said conduit from said compressor directly to said turbine in an amount decreasing at increasing total flow of air through said compressor and that there is no air flow through said equalizing conduit at full load operation of said plant.

2. A heat power plant comprising a multistage gas turbine, a multistage rotary compressor driven by said turbine, a high pressure combustion chamber comprising fuel supply means and being connected for compressed air flow with said compressor and being supplied with combustion air therefrom, and being connected for combustion gas flow with and supplying combustion gas to said turbine for its operation, and a plurality of equalizing conduits individually directly interconnecting such individual intermediate stages of said compressor and such individual intermediate stages of said turbine that air flows through said conduits from said compressor directly to said turbine in an amount decreasing at increasing total flow of air through said compressor and that no air flows through said equalizing conduits at full load operation of said plant.

3. A heat power plant comprising a multistage gas turbine, a multistage rotary compressor driven by said turbine, an exhaust conduit connected with said compressor, a high pressure combustion chamber comprising fuel supply means and being connected with said exhaust conduit and supplied with combustion air from said compressor, and being connected for combustion gas flow with and supplying combustion gas to said turbine for its operation, and a pressure equalizing conduit of substantially smaller flow capacity than that of said exhaust conduit and directly interconnecting such an intermediate stage of said compressor and such an intermediate stage of said turbine that air flows through said conduit from said compressor directly to said turbine in an amount decreasing at increasing total flow of air through said compressor.

4. A heat power plant comprising a multistage gas turbine, a multistage rotary compressor driven by said turbine, a high pressure combustion chamber comprising fuel supply means and being connected for compressed air flow with and being supplied with combustion air from said compressor, and being connected for combustion gas flow with and supplying combustion gas to said turbine for its operation, an equalizing conduit directly interconnecting such an intermediate stage of said compressor and such an intermediate stage of said turbine that air flows through said conduit from said compressor directly to said turbine in an amount decreasing at increasing total flow of air through said compressor, and an air flow control means in said equalizing conduit.

CLAUDE SEIPPEL.